(12) United States Patent
Tran et al.

(10) Patent No.: US 11,379,267 B1
(45) Date of Patent: Jul. 5, 2022

(54) AUTOMATIC RESOURCE ALLOCATION DESIGN FOR SATISFYING SERVICE LEVEL GOALS OF MIXED WORKLOAD QUERIES IN A DATABASE SYSTEM

(71) Applicant: Teradata US, Inc, San Diego, CA (US)

(72) Inventors: Hoa Thu Tran, Escondido, CA (US); Stephen A Brobst, Las Vegas, NV (US); Douglas P Brown, Rancho Santa Fe, CA (US); Frank Roderic Vandervort, Ramona, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 17/212,342

(22) Filed: Mar. 25, 2021

Related U.S. Application Data

(60) Provisional application No. 63/003,082, filed on Mar. 31, 2020.

(51) Int. Cl.
  *G06F 9/50* (2006.01)
  *G06F 16/25* (2019.01)
  *G06F 9/48* (2006.01)

(52) U.S. Cl.
  CPC .......... *G06F 9/5027* (2013.01); *G06F 9/4881* (2013.01); *G06F 16/25* (2019.01)

(58) Field of Classification Search
  CPC ....................................................... G06F 16/25
  USPC ......................................................... 709/223
  See application file for complete search history.

(56) References Cited

U.S. PATENT DOCUMENTS

| | | | | |
|---|---|---|---|---|
| 6,226,377 B1* | 5/2001 | Donaghue, Jr. | ........ | G06F 9/5038 709/201 |
| 6,272,544 B1* | 8/2001 | Mullen | .................... | G06F 9/505 709/224 |
| 7,996,842 B2* | 8/2011 | Savit | ........................ | G06F 9/505 718/103 |
| 8,151,269 B1* | 4/2012 | Brown | ................... | G06F 16/217 707/718 |
| 8,332,857 B1* | 12/2012 | Brown | ................... | G06F 9/5038 707/718 |

(Continued)

*Primary Examiner* — Wing F Chan
*Assistant Examiner* — Leon Y Tseng
(74) *Attorney, Agent, or Firm* — Howard Speight

(57) ABSTRACT

A database system receives a query to be processed. The database system has resources. A user assigns the query to a tier of resource allocation priorities in a hierarchy of tiers. The tier has been designated as being automatically managed by the database system. The tier has a plurality of levels of priority for resource allocation (LPRAs). The database system decomposes the query into a first step and a set of subsequent steps. The first step has a beginning and each of the set of subsequent steps has a respective beginning. The database system assigns the first step to a first LPRA, wherein executing the query at the first LPRA is projected by the database system to satisfy a service level goal (SLG) within a on_schedule_range of the SLG. The database system determines during execution of the set of subsequent steps that the query is no longer projected to satisfy the SLG within the on_schedule_range of the SLG and, as a result, assigns one of the set of subsequent steps to a second LPRA different from the first LPRA, wherein executing the query at the second LPRA is projected by the database system to return execution of the query to within the on_schedule_range of the SLG.

20 Claims, 9 Drawing Sheets

(56) References Cited

U.S. PATENT DOCUMENTS

| | | | |
|---|---|---|---|
| 8,516,488 B1* | 8/2013 | Brown | G06F 9/5038 |
| | | | 707/718 |
| 8,745,032 B1* | 6/2014 | Brown | G06F 16/2453 |
| | | | 707/812 |
| 8,775,413 B2* | 7/2014 | Brown | G06F 16/24549 |
| | | | 707/718 |
| 8,818,988 B1* | 8/2014 | Brown | G06F 16/217 |
| | | | 707/719 |
| 2007/0100793 A1* | 5/2007 | Brown | G06F 16/25 |
| 2007/0271570 A1* | 11/2007 | Brown | G06F 9/5033 |
| | | | 707/E17.007 |

* cited by examiner

AUTOMATIC RESOURCE ALLOCATION DESIGN FOR SATISFYING SERVICE LEVEL GOALS OF MIXED WORKLOAD QUERIES IN A DATABASE SYSTEM

CROSS-REFERENCE TO RELATED APPLICATIONS

This application claims the benefit of U.S. Provisional Patent Application No. 63/003,082 entitled "An Automatic Resource Alloction Design for Satisfying Service Level Goals of Mixed Workload Queries in a Database System," filed on Mar. 31, 2020, which is incorporated by reference in its entirety.

BACKGROUND

An enterprise analytics system must support varieties of concurrent workloads. Queries with similar response time service level goal (SLG) requirements are usually assigned to the same user-defined workload, i.e., Workload Definition (WD) for management purposes. Each WD may have a different response time SLG. For example, A tactical WD may require sub-second response time An online marketing WD may require 10-second response time A daily report WD may require response time in terms of minutes An Extract, Transform, and Load (ETL) job may require throughput in minutes or hours Tactical queries typically are simple and need very small amounts of resources, such as processor time, memory, input/output, network bandwidth, etc. Their SLGs can easily be achieved by essentially allowing these tactical queries to use as much of the resources as they need. For other WDs, consistently meeting their SLGs are much more difficult. The goal is to allocate a sufficient share of resources to a query to meet its SLG. The sufficient share amount is affected by two main factors:

Response time SLG/deadline. A query assigned to a WD with a short response time SLG needs more resources than when it is assigned to a WD with a long response time SLG.

Query complexity. Given the same response time SLG/deadline, a complex query needs more resources than a simple query.

It may be critical to meet SLGs of important WDs even at the expenses of less important WDs, when necessary. One workload management approach for meeting the SLG of a specific WD, such as the current SLG Tier WD in Teradata Active System Management (TASM), is to require the user to input a resource allocation for the worst case/query. Determining an appropriate amount of resources is a laborious trial-and-error process for a user. This process becomes more difficult when there are multiple WDs. Even after the challenging effort of determining the required allocations for WDs, there are still potential issues:

There may not be sufficient resources to meet SLGs for all WDs because the allocations are based on the worst cases/queries.

Since allocations are based on the worst case, queries requiring fewer resources receive more than they need and may complete much earlier than their SLGs without any reward/appreciation. Queries finishing early may create inappropriate user expectations and cause dissatisfaction because of large response time variations for queries in the same WD.

Another major obstacle of managing SLGs is the ability to dynamically speed up (or slow down) a specific query when it is likely to miss (or finish much earlier than) its SLG without impacting other equally important queries. For example, more resources need to be allocated to speed up a query which is not likely to meet its SLG. Usually, resource allocations are adjusted at the WD level. Therefore, increasing resources for a WD to speed up a specific query will also speed other queries in the same WD which do not need more resources.

Managing mixed workload queries so that they consistently meet their SLGs without requiring user input for resource allocations and automatically assigning and dynamically adjusting resource allocations for individual queries so that all queries meet their SLGs is a challenge.

SUMMARY

In one aspect, a computer-implemented method includes a database system receiving a query to be processed. The database system has resources. A user assigns the query to a tier of resource allocation priorities in a hierarchy of tiers. The tier has been designated as being automatically managed by the database system. The tier has a plurality of levels of priority for resource allocation (LPRAs). The database system decomposes the query into a first step and a set of subsequent steps. The first step has a beginning and each of the set of subsequent steps has a respective beginning. The database system assigns the first step to a first LPRA, wherein executing the query at the first LPRA is projected by the database system to satisfy a service level goal (SLG) within a on_schedule_range of the SLG. The database system determines during execution of the set of subsequent steps that the query is no longer projected to satisfy the SLG within the on_schedule_range of the SLG and, as a result, assigns one of the set of subsequent steps to a second LPRA different from the first LPRA, wherein executing the query at the second LPRA is projected by the database system to return execution of the query to within the on_schedule_range of the SLG.

Implementations may include one or more of the following. The database system assigning the first step to an LPRA may include identifying an initial LPRA using a performance metric goal of the tier to which the query was assigned and adjusting the first LPRA from the initial LPRA based on an estimate of the processing time of the query. The database system determining during execution of the set of subsequent steps that the query is no longer projected to satisfy the SLG within the on_schedule_range of the SLG and, as a result, assigning one of the set of subsequent steps to a second LPRA different from the first LPRA may include the database system monitoring the progress of the query and determining at the beginning of one of the set of subsequent steps that the query is now projected to fall below the on_schedule_range of the SLG and, as a result, assigning the one of the set of subsequent steps to an LPRA having a higher priority than the LPRA to which the step prior to the one of the set of subsequent steps was assigned. The database system determining during execution of the set of subsequent steps that the query is no longer projected to satisfy the SLG within the on_schedule_range of the SLG and, as a result, assigning one of the set of subsequent steps to a second LPRA different from the first LPRA may include the database system monitoring the progress of the query and determining at the beginning of one of the set of subsequent steps that the query is now projected to fall above the on_schedule_range of the SLG and, as a result, assigning the one of the set of subsequent steps to an LPRA having a lower priority than the LPRA to which the step prior to the one of the set of subsequent steps was assigned. The database system determining during execution of the set of subsequent steps that the query is no longer projected to satisfy the SLG within the on_schedule_range of the SLG and, as a result, assigning one of the set of subsequent steps to a second LPRA different from the first LPRA may include the database system monitoring the progress of the query and determining at the beginning of one of the set of subsequent steps that the query is now projected to fall below a far_off_schedule_range, wherein the far_off_schedule_range encompasses the on_schedule_range of the SLG, and, as a result, assigning the one of the set of subsequent steps to an LPRA having a higher priority than the LPRA to which the step prior to the one of the set of subsequent steps was assigned and a higher priority than the LPRA to which the one of the set of subsequent steps would have been assigned had the query been projected to fall within in the on_schedule_range. The database system determining during execution of the set of subsequent steps that the query is no longer projected to satisfy the SLG within the on_schedule_range of the SLG and, as a result, assigning one of the set of subsequent steps to a second LPRA different from the first LPRA may include the database system monitoring the progress of the query and determining at the beginning of one of the set of subsequent steps that the query is now projected to fall above a far_off_schedule_range, wherein the far_off_schedule_range encompasses the on_schedule_range of the SLG, and, as a result, assigning the one of the set of subsequent steps to an LPRA having a lower priority than the LPRA to which the step prior to the one of the set of subsequent steps was assigned and a lower priority than the LPRA to which the one of the set of subsequent steps would have been assigned had the query been projected to fall within the on_schedule_range. The database system may monitor the progress of the query and determine at the beginning of a close_to_completion_step of the subsequent steps that the query is now projected to fall outside the on_schedule_range of the SLG and, because the close_to_completion_step is to be executed, assign the one of the set of subsequent steps to the same LPRA as the step prior to the one of the close_to_completion_step. The close_to_completion_step may be the last of the subsequent steps. The close_to_completion_step may be a step of the subsequent steps that is projected to begin within a near_completion_time_percentage of the total query execution time.

In one aspect, a non-transitory computer-readable tangible medium includes a computer program. The computer program includes executable instructions, that, when executed, perform a method. The method includes a database system receiving a query to be processed. The database system has resources. A user assigns the query to a tier of resource allocation priorities in a hierarchy of tiers. The tier has been designated as being automatically managed by the database system. The tier has a plurality of levels of priority for resource allocation (LPRAs). The database system decomposes the query into a first step and a set of subsequent steps. The first step has a beginning and each of the set of subsequent steps has a respective beginning. The database system assigns the first step to a first LPRA, wherein executing the query at the first LPRA is projected by the database system to satisfy a service level goal (SLG) within a on_schedule_range of the SLG. The database system determines during execution of the set of subsequent steps that the query is no longer projected to satisfy the SLG within the on_schedule_range of the SLG and, as a result, assigns one of the set of subsequent steps to a second LPRA different from the first LPRA, wherein executing the query at the second LPRA is projected by the database system to return execution of the query to within the on_schedule_range of the SLG.

In one aspect, a computer-implemented method includes a database system having resources and maintaining a hierarchical plurality of tiers of priorities for allocating database resources. A user designating an automatically-managed tier from among the plurality of tiers as being automatically managed by the database system. The automatically-managed tier has a plurality of levels of priority for resource allocation (LPRAs). A database system receives a query to be processed and an assignment of the query to a workload definition (WD) assigned to the automatically-managed tier. The database system decomposes the query into a first step and a set of subsequent steps. The first step has a beginning and each of the set of subsequent steps has a respective beginning. The database system assigns the first step to a first LPRA, wherein executing the query at the first LPRA is projected by the database system to satisfy a service level goal (SLG) within a on_schedule_range of the SLG. The database system determines during execution of the set of subsequent steps that the query is no longer projected to satisfy the SLG within the on_schedule_range of the SLG and, as a result, assigns one of the set of subsequent steps to a second LPRA different from the first LPRA, wherein executing the query at the second LPRA is projected by the database system to return execution of the query to with the on_schedule_range of the SLG.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

This disclosure describes an automatic resource allocation technique for satisfying service level goals of mixed workload definition (WD) queries, such that:

no user input for WD resource allocations is required;
when speeding up or slowing down a query, there is minimal impact to queries in more important WDs;
resource allocation is adjusted at the query level so that a specific query can be sped up or slowed down.

Figure 1:
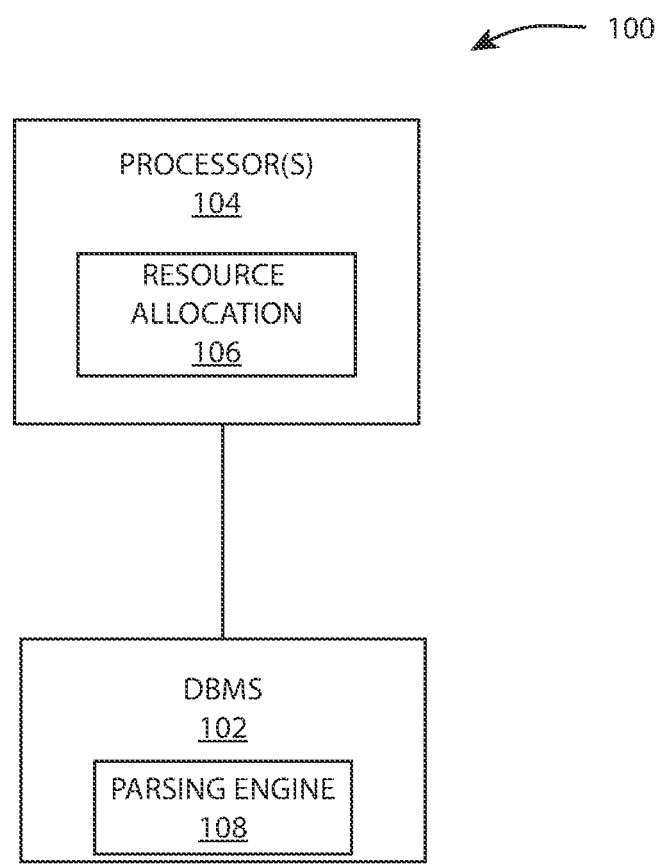
FIG. 1 is one example of a block diagram of a database system.

The technique disclosed herein has particular application, but is not limited, to systems such as the system 100 illustrated in FIG. 1. The system 100 includes a includes a variety of hardware components and software components that may be deployed on an appliance, on commodity hardware, in a private cloud, in a public cloud, or in a combination thereof. The software components are programmed as executable instructions into memory and/or a non-transitory computer-readable medium for execution on the hardware components (including, for example, hardware processors). The system 100 includes one or more network connections; the networks can be wired, wireless, or a combination of wired and wireless.

The system 100 implements, among other things, the processing described below in connection with FIGS. 1-12.

The system 100 includes a Database Management System (DBMS) 102, at least one hardware processor 104, and a non-transitory computer-readable storage medium having executable instructions representing a resource allocation technique 106 as disclosed herein.

The DBMS 102 may include a parsing engine 108, discussed below in connection with FIGS. 2 and 3, that organizes the storage of data and the distribution of database table rows, and coordinates the retrieval of data from the data-storage facilities in response to queries received from a user. The DBMS 100 usually receives queries and commands to build tables in a standard format, such as Structured Query Language (SQL).

Figure 2:
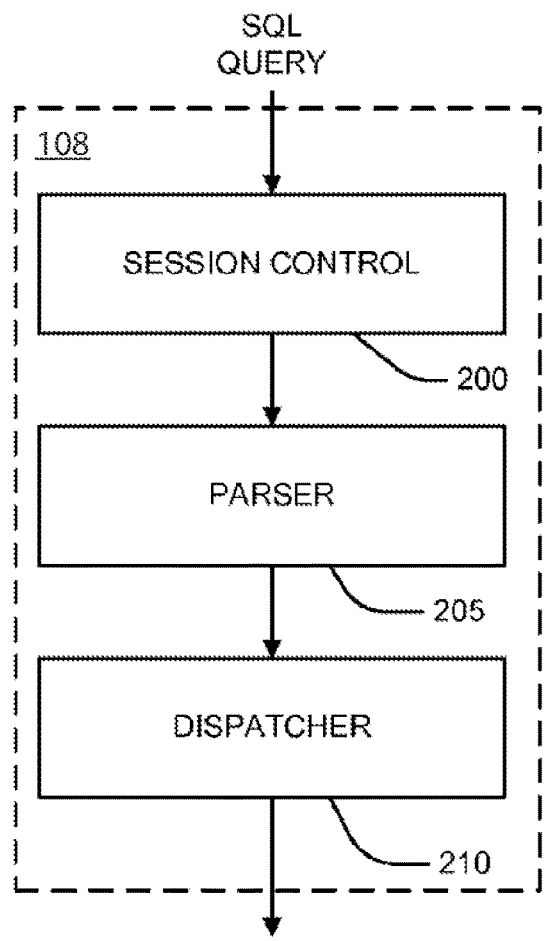
FIG. 2 is one example of a block diagram of a parsing engine.

Once the session control 200, shown in FIG. 2, allows a session to begin, a user may submit a SQL query, which is routed to the parser 205. As illustrated in FIG. 3, the parser 205 interprets the SQL query 300, checks it for proper SQL syntax 305, evaluates it semantically 310, and consults a data dictionary to ensure that all of the objects specified in the SQL query actually exist and that the user has the authority to perform the request 315. Finally, the parser 205 runs an optimizer 320, which develops the least expensive plan to perform the request and produces executable steps to execute the plan. A dispatcher 210 issues commands to the processing modules $110_1 \ldots _N$ to implement the executable steps.

Figure 4:
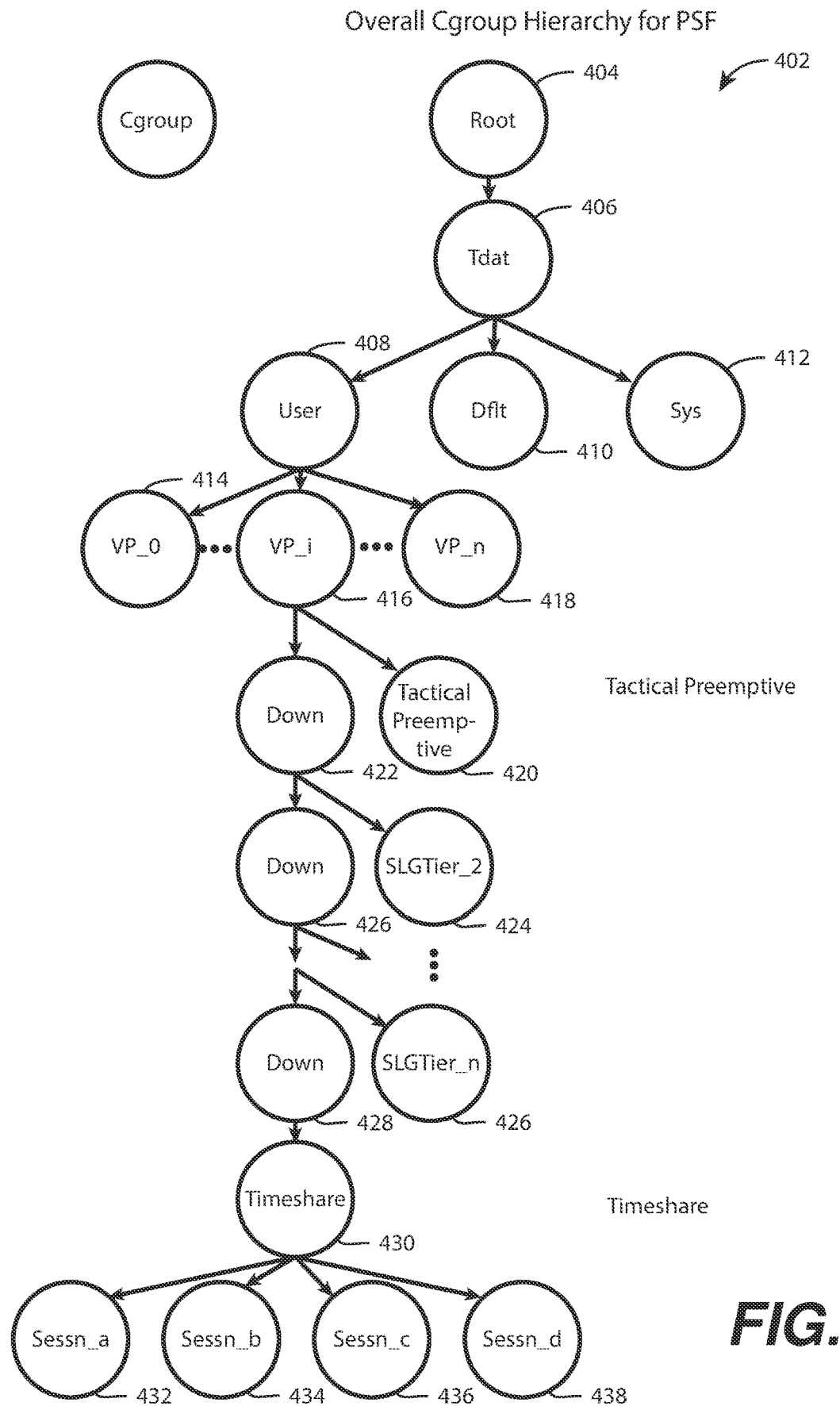
FIG. 4 illustrates an overall Cgroup hierarchy for a conventional resource allocation technique.

FIG. 4 illustrates an overall Cgroup hierarchy for a conventional resource allocation technique, such as that used by the Priority Scheduler Facility (PSF) provided by Teradata Corporation. Such a conventional resource allocation technique supports the hierarchy of groups and internal WDs for internal database work, tactical, SLG Tier, and timeshare WDs. As is known, "Cgroup" is an abbreviation for "control group," which "is a Linux kernel feature that limits, accounts for, and isolates the resource usage (CPU, memory, disk I/O, network, etc.) of a collection of processes." Wikipedia article on cgroups. In general, the priority for allocating resource usage to Cgroups in the hierarchy illustrated in FIG. 4 decreases from the top of the figure to the bottom. Generally, also, where two Cgroups are connected by an arrow the Cgroup touched by the arrowhead end of the arrow is a child Cgroup of the Cgroup touched by the non-arrowhead end of the arrow. An arrow on the figure also indicates composition in terms of allocating resources with the Cgroup touched by the non-arrowhead end of the arrow managing the Cgroup touched by the arrowhead end of the arrow.

The Cgroup hierarchy 402 shown in FIG. 4 includes a "Root" Cgroup 404 that contains a "Tdat" Cgroup 406. The Tdat Cgroup 406 contains the "User" Cgroup 408, the "Dflt" Cgroup 410, and the "Sys" Cgroup 412. The User Cgroup 408 contains a group of n+1 Cgroups, three of which are shown (the others are represented by ellipses): "VP_0" Cgroup 414, "VP_i" Cgroup 416, and VP_n" Cgroup 418. One of the Cgroups contained in the User Cgroup, the VP_i Cgroup 416, contains a Tactical Preemptive Cgroup 420. The VP_i Cgroup 416 also contains a "Down" Cgroup 422. The Down Cgroup 422 contains a SLGTier_2 Cgroup 424 and a "Down" Cgroup 426, giving each a lower priority than the Tactical Preemptive Cgroup 420, which is higher on the hierarchy shown in FIG. 4 than the SLGTier 2 Cgroup 424.

The Down Cgroup 426 contains another Down Cgroup and another "SLGTier" Cgroup, which are not shown in FIG. 4 but are represented by the ellipsis below the SLGTier_2 Cgroup, at a lower priority than those Cgroups higher on the hierarchy shown in FIG. 4 (i.e., the Tactical Preemptive Cgroup 420 and the SLGTier_2 Cgroup 424). The ellipsis also represents n−3 Down Cgroups and SLGTier Cgroups (where the total number of SLGTier Cgroups is "n−1"). The n−$3^{rd}$ Down Cgroup represented by the ellipsis contains a SLGTier_n Cgroup 426 and an nth Down Cgroup 428 at a lower priority than those Cgroups higher on the hierarchy shown in FIG. 4 (i.e., the Tactical Preemptive Cgroup 420, the SLGTier_2 Cgroup 424 and all of the SLGTier Cgroups represented by the ellipsis). The final Down Cgroup 428 contains a Timeshare Cgroup 430, which contains a group of session Cgroups, e.g., Sessn_a Cgroup 432, Sessn_b Cgroup 434, Sessn_c Cgroup 436, and Sessn_d Cgroup 438, all at a lower priority than the Cgroups higher in the hierarchy shown in FIG. 4.

Figure 5:
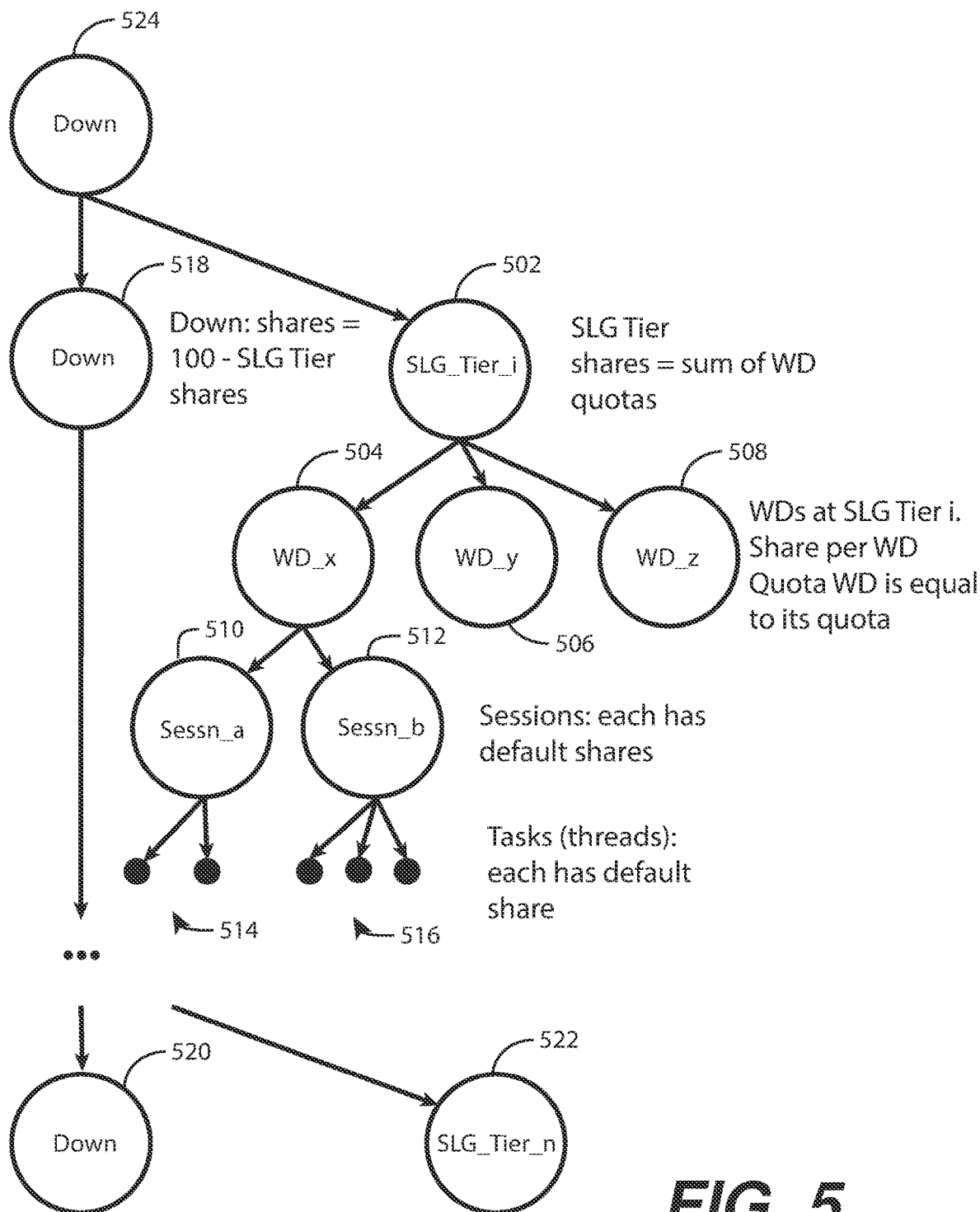
FIG. 5 illustrates allocation of priority shares among workload definitions (WDs) assigned to an SLG tier.

FIG. 5 illustrates allocation of priority shares among WDs assigned to an SLG tier. The number of priority shares allocated to a SLG Tier, such as SLG_Tier_i 502, which may be one of the the SLG_Tiers 420, 424, and 426 illustrated in FIG. 4, is equal to the sum of the quotas (or shares) allocated to each of the WDs assigned to that SLG Tier, i.e., in the example shown in FIG. 5, WD_x 504, WD_y 506, and WD_z 508. Each WD may have sessions. In the example shown in FIG. 5, WD_x has two sessions Sessn_a 510 and Sessn_b 512. Each of the sessions has a default number of shares. Each session may have tasks. In the example shown in FIG. 5, Sessn_a 510 has tasks 514 and Sessn_b 512 has tasks 516. Each of the tasks is allocated a default number of shares. The Down Cgroup 518 is allocated 100—SLG Tier shares allocated to SLG_Tier_i. As can be seen, the number of shares available for allocation diminishes for Down Cgroups and SLG_Tiers lower in the hierarchy, such as Down Cgroup 520 and SLG_Tier_n 522.

Figure 6:
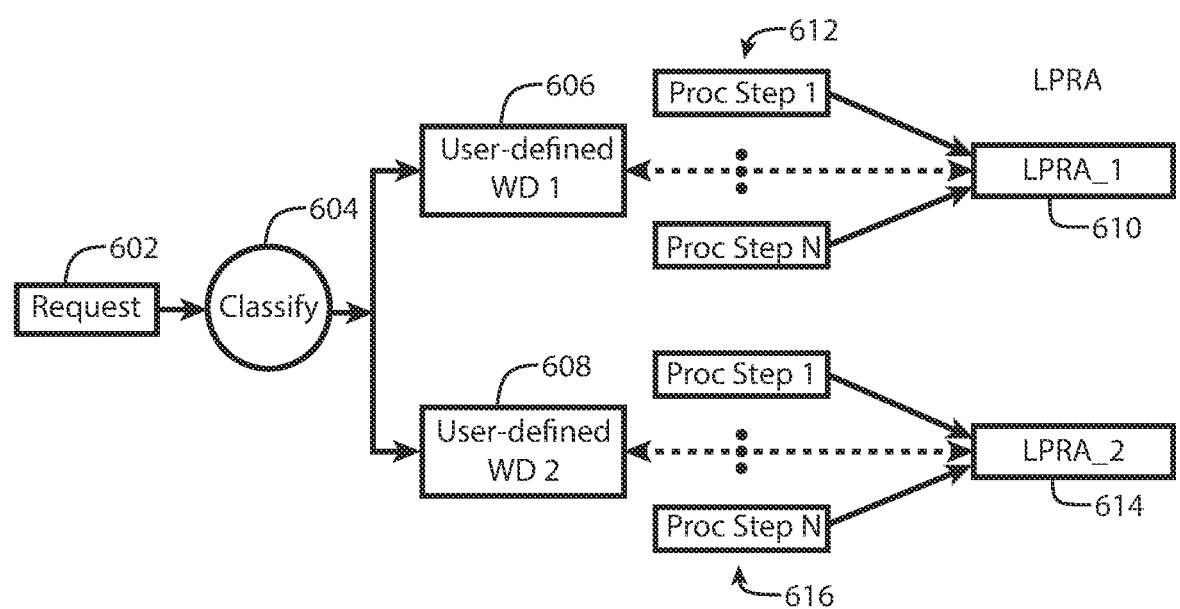
FIG. 6 illustrates a mapping between WDs and the processing steps performed under those WDs and levels of priority for resource allocation (LPRA or, in Teradata's system, PSF_WD) with a conventional resource allocation technique.

FIG. 6 illustrates a mapping between WDs and the processing steps (abbreviated to "Proc Step" in FIGS. 6 and 7) performed under those WDs and levels of priority for resource allocation (LPRA or, in Teradata's system, PSF_WD) with a conventional resource allocation technique. A conventional resource allocation technique implements a one-to-one mapping between a user-defined WD and an LPRA. That is, as illustrated in FIG. 6, a request (or query) 602 is classified 604 into a user-defined WD, e.g., User-Defined WD 1 606 or User-Defined WD 2 608. Once the request is classified into User-Defined WD 1 606 or User-Defined WD 2 608, all processing steps of a query are assigned to the same user-defined WD and LPRA. That is, in the example shown in FIG. 6, a query assigned to User-Defined WD 1 will be assigned to LPRA_1 610, as will all of the processing steps 1 through N 612 for that query. Similarly, a query assigned to User-Defined WD 2 will be assigned to LPRA_2 614, as will all of the processing steps 1 through N 616 for that query.

There is no monitoring and no dynamic adjustment of resource allocations in such a conventional resource allocation technique.

The automatic resource allocation technique disclosed herein leverages the above PSF hierarchy and SLG Tier WDs (shown as WD Quota WDs in FIG. 5). PSF provided by Teradata Corporation provides interfaces for creating SLG Tier WDs with specific resource allocations.

Figure 7:
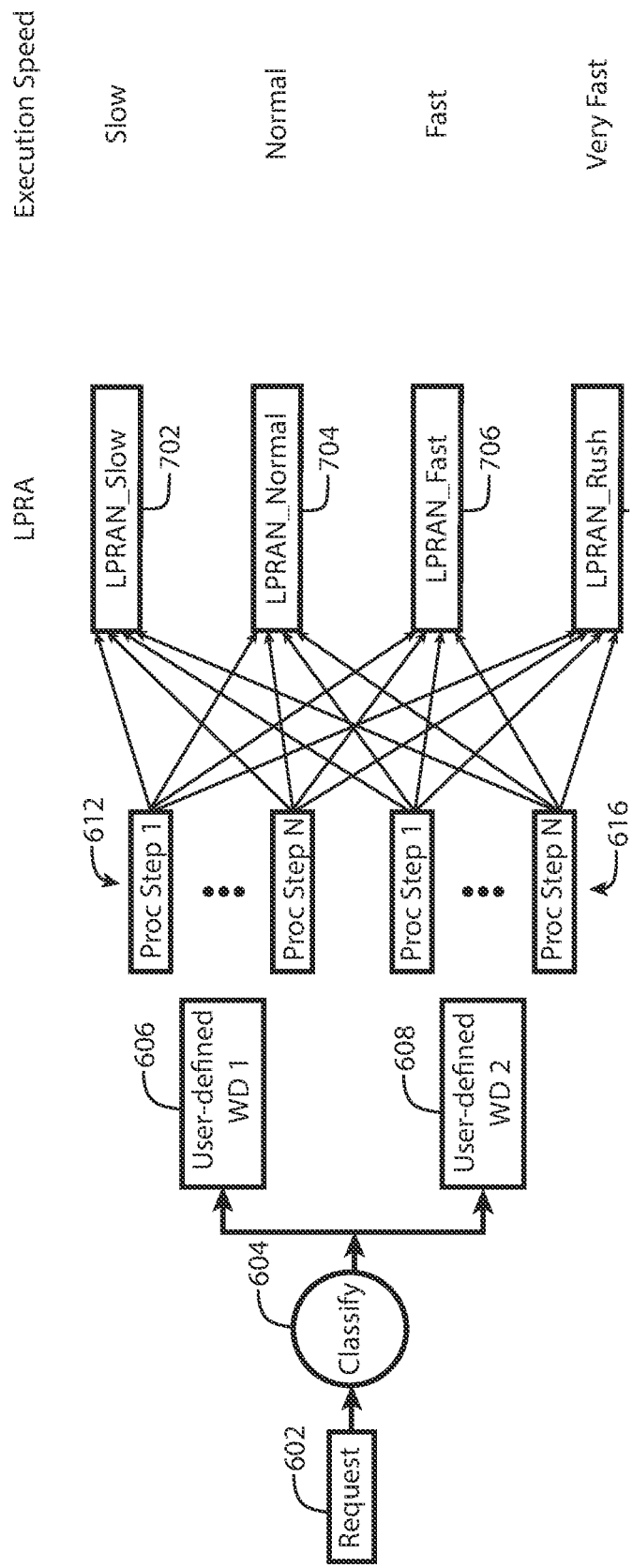
FIG. 7 illustrates a mapping between WDs and LPRAs with an automatic resource allocation technique.

FIG. 7 illustrates a mapping between WDs and LPRAs with an automatic resource allocation technique. In the automatic resource allocation technique illustrated in FIG. 7, each of the processing steps 612, 616 can be assigned to any of four Internal LPRAs: LPRAN_Slow 702 operating at a slow execution speed, LPRAN_Normal 704 operating at a normal execution speed, LPRAN_Fast 706 operating at a fast execution speed, or LPRAN_Rush 708 operating at a very fast execution speed. It will be understood that the number of LPRAs may be higher or lower than that discussed above in connection with FIG. 7. The LPRAs in FIG. 7 are designated with an "N" (i.e., LPRAN_Slow, LPRAN_Normal, LPRAN_Fast, and LPRAN_Rush) to indicate that the LPRAs may be different for each tier. That is, the LPRAs for tier 1 (e.g., LPRA1_Slow, LPRA1_Normal, LPRA1_Fast, and LPRA1_Rush) may have a different designation than the LPRAs for tier 2 (e.g., LPRA2_Slow, LPRA2_Normal, LPRA2_Fast, and LPRA2_Rush). The number of LPRAs may be different for each tier and the LPRAs may be different for each selected tier.

Because the processing steps for a given query can be performed under different LPRAs, the automatic resource allocation technique breaks the one-to-one mapping between user-defined WDs and LPRAs so that WD management can dynamically adjust resource allocations for individual queries as needed.

Figure 8:
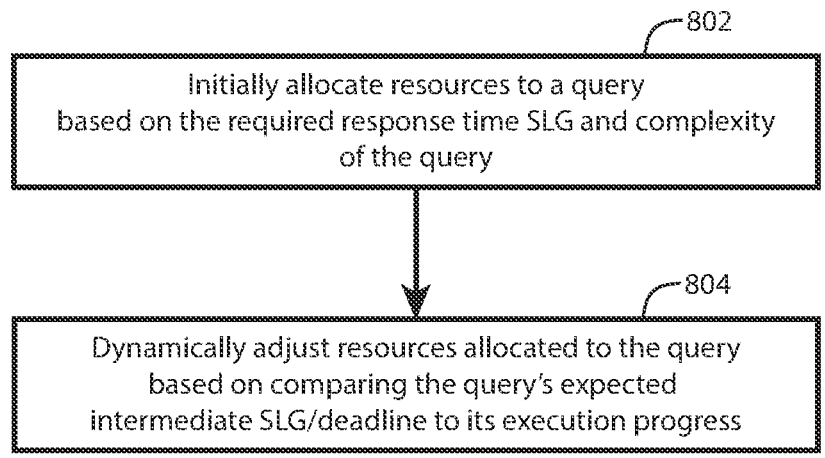
FIG. 8 illustrates an illustrative example of the automatic resource allocation technique.

FIG. 8 illustrates an illustrative example of the automatic resource allocation technique. In the automatic resource allocation technique, resources are initially allocated to a query based on a performance metric goal (such as an SLG) of the query and the complexity of the query (802). Then, allocations are dynamically adjusted based on comparing the query's expected intermediate SLG/deadline to its execution progress (804). The automatic resource allocation technique:
1) allocates more resources to queries with short response time SLGs and less resources to queries with long response time SLGs so that all queries meet their SLGs;
2) allocates more resources to complex queries and less resources to simple queries so that all queries meet their SLGs;
3) monitors progress of all queries and allocates more resources if a query is behind its expected intermediate deadline/progress and reduces resources if a query is ahead of its expected intermediate deadline/progress so that all queries meet their SLGs.

Figure 9:
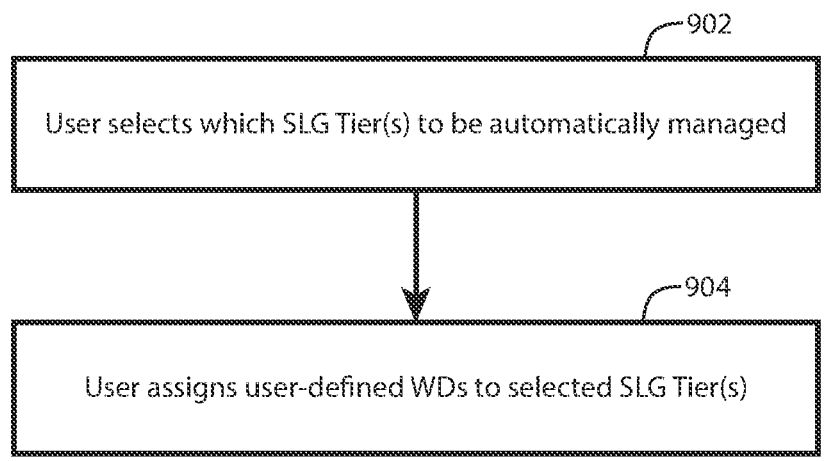
FIG. 9 illustrates an illustrative example of user selection of SLG tiers to be managed and the assignment of user-defined workloads to the selected tiers.

FIG. 9 illustrates an illustrative example of user selection of SLG tiers to be managed and the assignment of user-defined WDs to the selected tiers. As shown in FIG. 9, a user may select which SLG Tier(s) to be automatically managed (902) and the user may assign user-defined WDs to a selected tier (904).

For each selected tier, several internal LPRAs, such as the LPRAN_Slow 702, the LPRAN_Normal 704, the LPRAN_Fast 706, and the LPRAN_Rush 708 shown in FIG. 7, are created with appropriate allocations (typically as share percentages) to support various query execution speeds for the tier.

Generally, an LPRA with higher allocation corresponds to a faster execution speed, as shown in FIG. 7, and vice-versa. Faster execution speed may be accomplished by increasing one or more of the number of central processing unit (CPU) seconds, the input/output capacity, the memory capacity, etc. (i.e., the "resources"). Lower execution speeds may be accomplished by reducing one or more of the resources. The number of LPRAs depends on how granular the speeds are required to be. Most of the resources for the tier will be allocated to these LPRAs for resource-intensive work of the query such as processing steps. Only a small portion (e.g., 10%) will be reserved for user-defined WDs for reporting purposes and less demanding work of the query (such as parsing, execution coordination, etc.). In the example shown in FIG. 7, four internal LPRAs are created for each auto-managed SLG Tier as follows:

| LPRA | Allocation | Execution Speed |
|---|---|---|
| LPRA Slow | TierN_SlowPercentage | Slow |
| LPRA Normal | TierN_NormalPercentage | Normal |
| LPRA Fast | TierN_FastPercentage | Fast |
| LPRA Rush | TierN_RushPercentage | Very Fast |

Below is an allocation example for Tier 1:
Tier1_SlowPercentage=10%
Tier1 NormalPercentage=20%
Tier1 FastPercentage=25%
Tier1_RushPercentage=35%
User-defined WDs=10%

| LPRA | Allocation | Execution Speed |
|---|---|---|
| LPRA1_Slow | 10% share | Slow |
| LPRA1_Normal | 20% share | Normal |
| LPRA1_Fast | 25% share | Fast |
| LPRA1_Rush | 35% share | Very Fast |
| User-defined WDs | 10% share | N/A |

Figure 3:
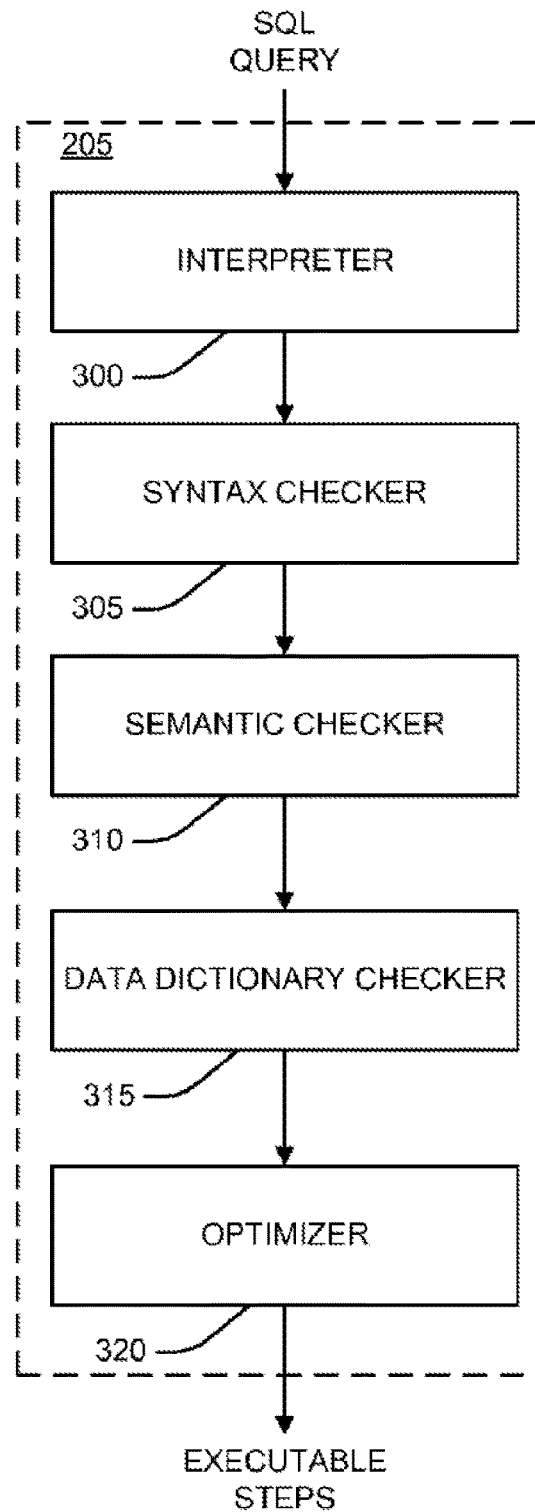
FIG. 3 is one example of a block diagram of a parser.
Figure 10:
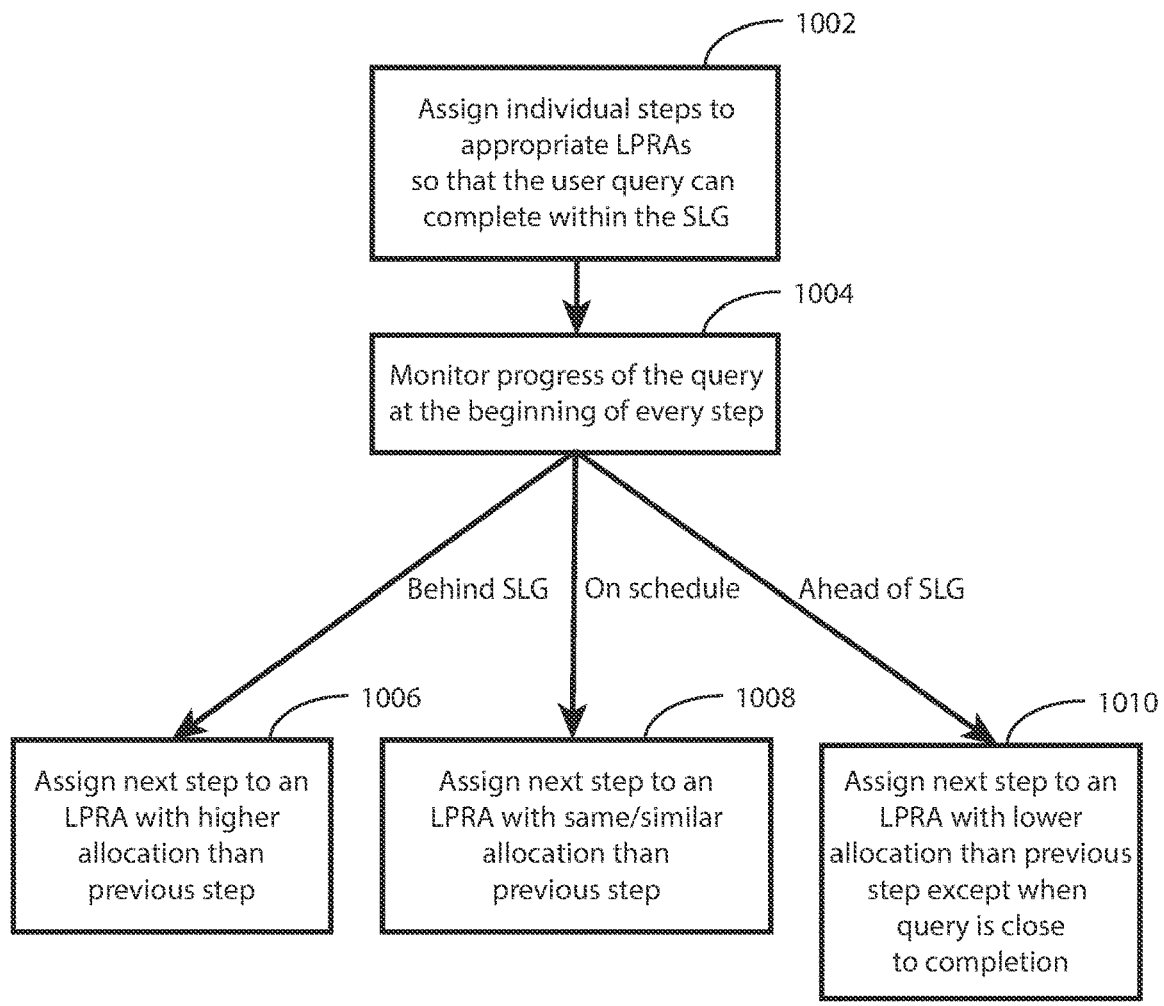
FIG. 10 is a flow chart of an automatic resource allocation technique.

In a database system 100 (such as that shown in FIG. 1), a user query is optimized and decomposed into a set of steps, such as the steps 612 and 616 shown in FIGS. 6 and 7, by the parser 205 (see FIGS. 2 and 3). Then, the dispatcher 210 classifies the query into a user-defined WD (which has a specific response time SLG) and sends the steps to processing modules 110-$_{1 \ldots N}$. Alternatively, the dispatcher may assign the query to an appropriate LPRA without classifying the query to a WD, which in concept is similar to a query being assigned to a WD with only one member and its own set of allocated resources. Under the automatic resource allocation technique, as shown in FIG. 10, the dispatcher 210 will perform the following additional work for each step to improve the likelihood that a query will meet its SLG:

1. Assigning individual steps to appropriate LPRAs so that the user query can complete within the SLG (1002).
2. Monitoring progress of the query at the beginning of each step (or, alternatively, at the beginning of selected steps, such as every other step or every fifth step, etc., or at the beginning of randomly selected steps or at the beginning of steps exceeding certain cost estimates) and dynamically adjusting resource allocation as follows (1004):

If the query is behind its SLG (i.e., actual response time up to the last completed step is larger than accumulated estimated processing time up to the last completed step), assign the next step to an LPRA with higher allocation than the previous step to speed it up (1006).

If the query is on schedule (i.e., actual response time up to last completed step is comparable to accumulated estimated processing time up to the last completed step), assign the next step to an LPRA with the same/similar allocation as the previous step to maintain the similar execution speed (1008).

If the query is ahead of its SLG (i.e., actual response time up to last completed step is less than the accumulated estimated processing time up to the last completed step), assign the next step to an LPRA with lower allocation than the previous step to slow it down except when the query is close to completion (e.g., on the last step of the query or within 10% completion time) (1010).

The dispatcher uses different rules for assigning the first step and subsequent steps of a query to LPRAs.

For the first step of a query, the dispatcher assigns the LPRA based on the SLG of the user-defined WD and the processing time estimate of the entire query (element 802, FIG. 8).

For subsequent steps, the dispatcher assigns/adjusts the LPRA assignment based on the estimated processing time and actual response time of completed steps (as described above) (element 804, FIG. 8).

First Step Assignment

Figure 11:
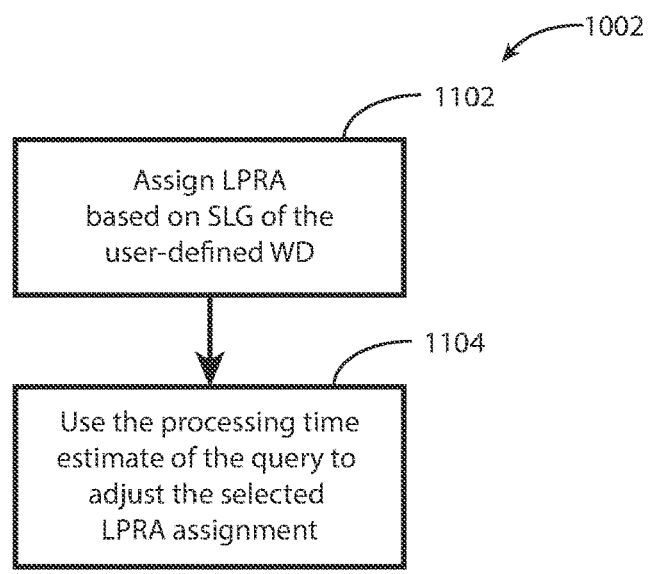
FIG. 11 is a flow chart of the first step of LPRA assignment.

LPRA assignment for the first step is done in two phases, as shown in FIG. 11. In phase 1 of the first step 1002, the LPRA is assigned based on SLG of the user-defined workload (1102). Then, in phase 2 of the first step 1002, the processing time estimate of the query is used to adjust the LPRA assignment, if necessary (1104). Phase 2 of the first step does not result in an adjustment if the processing time estimate of the query does not indicate such an adjustment is required.

a) Phase 1—SLG-Based PSF WD Assignment

For each execution speed (i.e., slow, medium, fast, and rush), define a percentage boundary which is translated into an SLG percentile value. A query is assigned to an LPRA based on its SLG relative to the SLG percentile values. Generally, a query with a short SLG is assigned to a very fast LPRA while a query with very long SLG is assigned to a slow LPRA, and so on. The table below describes an example of how the SLG of a query is used for LPRA assignment.

| Phase 1 - SLG-Based Assignment | Category | LPRA |
| --- | --- | --- |
| ShortSLGpercentile <= Query's SLG <= Medium SLGpercentile | Medium SLG | LPRAN_Fast |
| MediumSLGpercentile <= Query's SLG <= LongSLGpercentile | Long SLG | LPRAN_Medium |
| Query's SLG > LongSLGpercentile | Very long SLG | LPRAN_Slow |
| Query's SLG < ShortSLGpercentile | Short SLG | LPRAN_Rush |

Suppose, for example:
SLGs of 5 WDs=15.0, 16.0, 16.5, 28.0, and 31.5 seconds
Selected percentage boundaries:
  Short 5%
  Medium 50%
  Long 95%
Then,
ShortSLGpercentile=$5^{th}$ percentile=15.0
MediumSLGpercentile=$50^{th}$ percentile=16.5
LongSLGpercentile=$95^{th}$ percentile=31.5

The following tables describes an example of how a dispatcher might perform SLG-Based LPRA assignment:

| Phase 1 - SLG-Based Assignment | Category | LPRA |
| --- | --- | --- |
| 15.0 <= Query's SLG <= 16.5 seconds | Medium SLG | LPRAN_Fast |
| 16.5 <= Query's SLG <= 31.5 seconds | Long SLG | LPRAN_Medium |
| Query's SLG > 31.5 seconds | Very long SLG | LPRAN_Slow |
| Query's SLG < 15.0 seconds | Short SLG | LPRAN_Rush | b) Phase 2—Adjustment Based on Processing Time Estimate

Queries assigned to the same WD may have significantly different processing time estimates possibly due to complexity, data, etc. Therefore, the LPRA assignment in Phase 1 may need to be adjusted so that all queries can still meet their SLGs. For example, the processing time estimate of a query may be used to assign it to one of the following complexity levels to determine if adjustment to Phase 1 is needed:
  Simple: slow down one level
  Average: no adjustment needed
  Hard: speed up one level
  Harder: speed up two levels Similar to the SLG percentile values described above, a percentage boundary for each complexity level is selected. Then, historical query processing time estimates of the WD (i.e., processing time estimates of completed queries) are used to define corresponding complexity percentile values for the WD. A query is assigned to a complexity level based on its processing time estimate relative to the complexity percentile values of its WD.

| Phase 2 - Processing Time Estimate Adjustment | Category | Adjusted LPRA |
| --- | --- | --- |
| SimplePercentile <= QueryProcessingTimeEstimate <= AveragePercentile | Average | Same as SLG-Based LPRA in Phase 1 |
| AveragePercentile <= QueryProcessingTimeEstimate <= HardPercentile | Hard | Speed up one level |
| QueryProcesingTimeEstimate > HardPercentile | Harder | Speed up two levels |
| QueryProcesingTimeEstimate < SimplePercentile | Simple | Slow down one level |

As an example, suppose,
Complexity percentage boundaries:
   Simple 10%
   Average 40%
   Hard 80%
And, percentile values for simple, average, and hard queries, which are calculated from historical query processing time estimates of the WD, are:
   SimplePercentile=$10^{th}$ percentile=3.32 seconds
   AvegeragPercentile=$40^{th}$ percentile=13.79 seconds
   HardPercentile=$80^{th}$ percentile=102.96 seconds
Then, the adjustment to the LPRA assignment in Phase 1 is based on the percentile of each query's processing time estimate as follows:

| Phase 2 - Processing Time Estimate Adjustment | Category | Adjusted LPRA |
| --- | --- | --- |
| 3.32 <= QueryProcesingTimeEstimate <= 13.79 seconds | Average | Same as SLG-Based LPRA |
| 13.79 <= QueryProcesingTimeEstimate <= 102.96 seconds | Hard | Speed up one level |
| QueryProcesingTimeEstimate > 102.96 seconds | Harder | Speed up two levels |
| QueryProcesingTimeEstimate < 3.32 seconds | Simple | Slow down one level |

If historical processing time estimates are not available, percentile values can initially be substituted with simple multipliers of a WD's SLG. For example, use 0.5×SLG, 2×SLG, and 6×SLG for SimplePercentile, AveragePercentile, and HardPercentile, respectively.

Subsequent Step Assignment

Generally, the dispatcher assigns the LPRA for subsequent steps based on progress of the query as follows (as shown in FIG. 10):

If the query is behind its SLG (i.e., actual response time up to last completed step is larger than accumulated estimated processing time up to the last completed step), assign the next step to an LPRA with a higher allocation than the previous step to speed it up (1006).

If the query is on schedule (i.e., actual response time up to last completed step is comparable to accumulated estimated processing time up to the last completed step), assign the next step to an LPRA with the same/similar allocation as the previous step to maintain the similar execution speed (1008).

If the query is ahead of its SLG (i.e., actual response time up to last completed step is less than accumulated estimated processing time up to the last completed step), assign the next step to an LPRA with a lower allocation than the previous step to slow it down except when the query is close to completion (e.g., on the last step of the query or within a near_completion_time_percentage of the total query execution time (e.g., 10% of the completion time)) (1010). Note that if the query is close to completion but behind its SLG, the next step will be assigned as described above in the first bullet of this paragraph.

The database system may project the SLG performance expected at the beginning of each of the steps, against which the comparisons described above are made, at the beginning of execution of the query. In that case, the SLG performance expected at the beginning of each step will be established at the beginning of execution of the query. Alternatively, the database system may project the SLG performance at the beginning of each of the steps the SLG performance for each of the remaining steps to satisfy overall SLG performance for the query.

Figure 12:
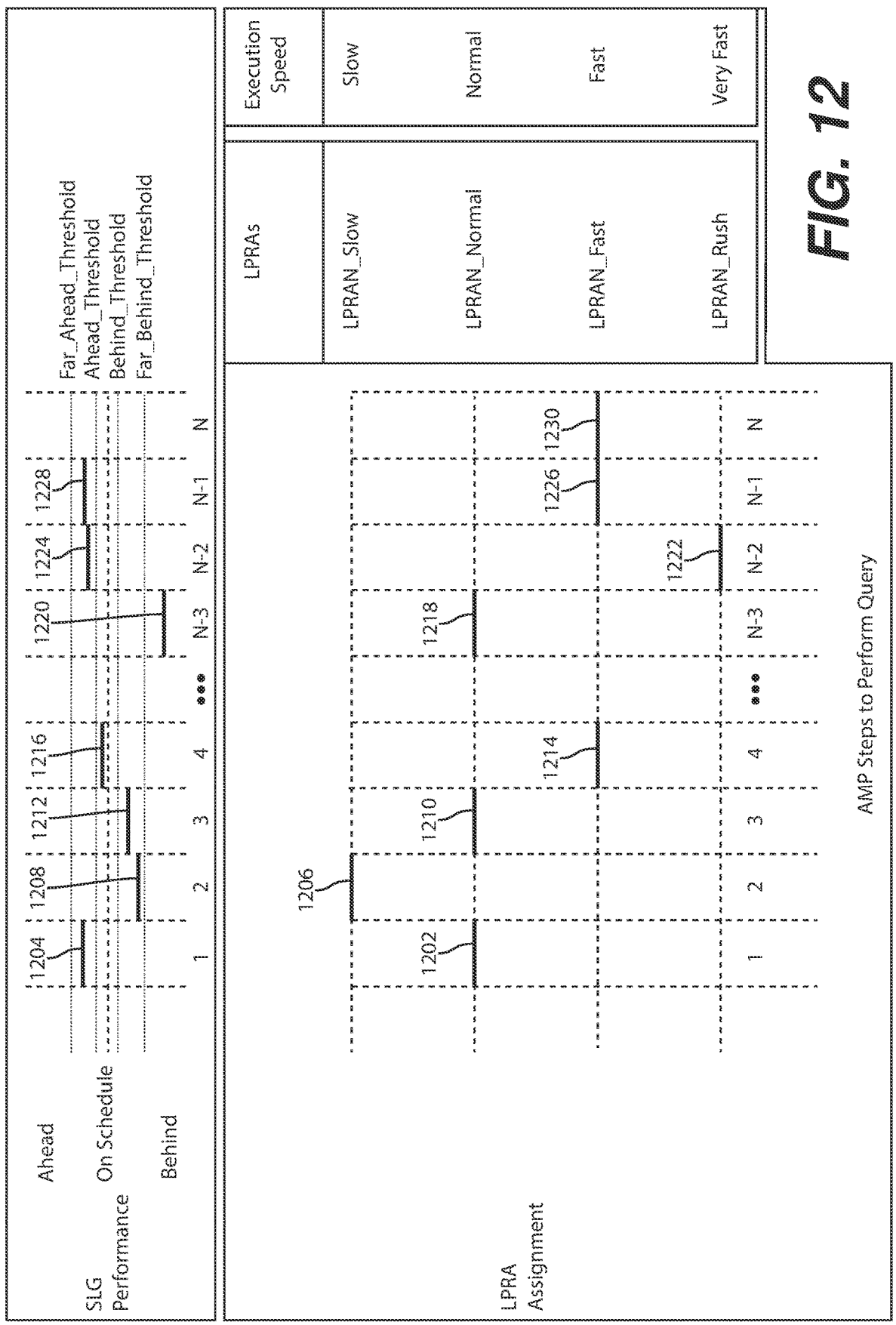
FIG. 12 illustrates an example of initial step LPRA assignment and subsequent step LPRA assignments for an example query being processed by a database system.

FIG. 12 illustrates an example of initial step LPRA assignment and subsequent step LPRA assignments for an example query being processed by a database system. FIG. 12 includes two charts, an SLG Performance chart and an LPRA Assignment chart. The latter includes two sub-charts labeling each of the four levels shown in the main body of the chart with the LPRAs and the Execution Speeds. In the example shown in FIG. 12, the query being processed includes N steps. As such, the two charts in FIG. 12 are vertically divided into N parts, labeled 1, 2, . . . N. The SLG Performance chart shows the SLG performance of the query during each of the N steps of the query being processed and includes an "On Schedule" line, reflecting the expected SLG performance of the query, an "Ahead_Threshold" line, reflecting an SLG performance threshold above which is considered ahead of schedule, a "Far_Ahead_Threshold" line, reflecting an SLG performance threshold above which is considered far ahead of schedule, a "Behind_Threshold" line, reflecting an SLG performance threshold below which is considered behind schedule, and a "Far_Behind_Threshold" line, reflecting an SLG performance threshold below which is considered far behind schedule.

Generally, if SLG performance is outside an "on_schedule_range," i.e., ahead of the Ahead_Threshold but behind the Far_Ahead_Threshold or behind the Behind_Threshold but ahead of the Far_Behind_Threshold, the LPRA assignment is adjusted for the next step. If SLG performance is outside an "far_off_schedule_range," i.e., ahead of the Far_Ahead_Threshold or behind the Far_Behind_Threshold, the LPRA assignment is adjusted more significantly (e.g., by two LPRA steps instead of one) for the next step than if the SLG performance is in the on_schedule_range. It will be understood that the thresholds and ranges illustrated are merely examples. The number of thresholds and ranges can be larger than that shown and, taken to an extreme, can be implemented as a very large number of thresholds and ranges to simulate a virtually continuous range against which SLG performance can be tested.

In the Example shown in FIG. 12, the user has assigned the query to be processed to a WD that the user has assigned to a tier that the user has previously set to be managed using the automatic resource allocation technique described out above. As such, in phase 1 of the first step, the LPRA of steps of the query is assigned based on SLG of the user-defined WD. Then, in phase 2 of the first step, the processing time estimate of the query is used to adjust the selected LPRA, if necessary. In the example shown, the result of first step processing is that step 1 of the query is assigned to LPRAN_Normal, to be executed at normal execution speed, as indicated by line 1202. SLG performance during step 1 (calculated in the example shown at the end of performance of step 1), indicated by line 1204, is above the On Schedule line, above the Ahead_Threshold line, and below the Far_Ahead_Threshold. As such the automatic resource allocation technique assigns the next step, step 2, to the next-lower priority LPRA, LPRAN_Slow, as indicated by line 1206.

SLG performance during step 2 (calculated in the example shown at the end of performance of step 2), indicated by line 1208, is below the On Schedule line and the Behind_Threshold line, but above the Far_Behind_Threshold. As such, the automatic resource allocation technique assigns the next step, step 3, to the next-higher priority LPRA, LPRAN_Normal, as indicated by line 1210.

SLG performance during step 3 (calculated in the example shown at the end of performance of step 3), indicated by line 1212, while improved over the performance of step 2, is still below the On Schedule line and the Behind_Threshold line, but above the Far_Behind_Threshold. As such, the automatic resource allocation technique assigns the next step, step 4, to the next-higher priority LPRA, LPRAN_Fast, as indicated by line 1214.

SLG performance during step 4 (calculated in the example shown at the end of performance of step 4), indicated by line 1216, further improved over the performance of steps 2 and 3, is above the On Schedule line but below the Ahead_Threshold line and the Far_Ahead_Threshold line. As such, the automatic resource allocation technique assigns the next step, step 5, to same priority LPRA as step 4.

SLG performance and LPRA assignment for steps 5 through N-4 are not shown in FIG. 4 and are represented by the ellipses. At the end of that processing the automatic resource allocation technique has assigned step N-3 to the LPRAN_Normal, as indicated by line 1218.

SLG performance during step N-3 (calculated in the example shown at the end of performance of step N-3), indicated by line 1220, is below the On Schedule line, the Behind_Threshold, and the Far_Behind_Threshold. As such, the automatic resource allocation technique assigns the next step, step N-2, to a priority PSF WD tier that is two tiers above that of step N-3, the LPRAN_Rush tier, as indicated by line 1222.

SLG performance during step N-2 (calculated in the example shown at the end of performance of step N-2), indicated by line 1224, is above the On Schedule line and the Ahead_Threshold line but below the Far_Ahead_Threshold. As such, the automatic resource allocation technique assigns the next step, step N-1, to a priority PSF WD tier that is one tier below that of step N-2, the LPRAN_Fast, as indicated by line 1226.

SLG performance during step N-1 (calculated in the example shown at the end of performance of step N-1, indicated by line 1228), is above the On Schedule line and the Ahead_Threshold line but below the Far_Ahead_Threshold. Because the next step is close to completion, the automatic resource allocation technique does not assign the next step, step N, to a lower priority LPRA but instead leaves it at the same priority as step N-1, as indicated by line 1230.

The query completes step N and ends processing at the LPRAN_Fast level.

Note that some of the calculations and configuration work described above only need to be done once, possibly when activating a WD management ruleset which includes configuring/creating user-defined WDs. This work includes:
  Calculating/Setting SLG percentile values;
  Calculating/Setting complexity percentile values for each WD; and
  Creating internal LPRAs for different execution speeds for each SLG Tier.

In addition, percentages, percentile values, and share allocations for internal PSF WDs can also be adjusted dynamically, if necessary. Dynamic adjustments can be adapted to integrate with suitable machine learning models to handle changes in WDs, system's conditions, etc.

Further examples consistent with the present teaching are set out in the following numbered clauses:

Clause 1. A computer-implemented method comprising:
  a database system receiving a query to be processed;
  the database system having resources;
  a user assigning the query to a a tier of resource allocation priorities in a hierarchy of tiers, the tier having been designated as being automatically managed by the database system, the tier having a plurality of levels of priority for resource allocation (LPRAs);
  the database system decomposing the query into a first step and a set of subsequent steps, the first step having a beginning and each of the set of subsequent steps having a respective beginnings;
  the database system assigning the first step to a first LPRA, wherein executing the query at the first LPRA is projected by the database system to satisfy a service level goal (SLG) within a on_schedule_range of the SLG; and
  the database system determining during execution of the set of subsequent steps that the query is no longer projected to satisfy the SLG within the on_schedule_range of the SLG and, as a result, assigning one of the set of subsequent steps to a second LPRA different from the first LPRA, wherein executing the query at the second LPRA is projected by the database system to return execution of the query to within the on_schedule_range of the SLG.

Clause 2. The computer-implemented method of clause 1, wherein the database system assigning the first step to an LPRA includes:
  identifying an initial LPRA using a performance metric goal of the WD to which the query was assigned; and
  adjusting the first LPRA from the initial LPRA based on an estimate of the processing time of the query.

Clause 3. The computer-implemented method of any of clauses 1 and 2, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
  the database system monitoring the progress of the query and determining at the beginning of one of the set of subsequent steps that the query is now projected to fall below the on_schedule_range of the SLG and, as a result, assigning the one of the set of subsequent steps to an LPRA having a higher priority than the LPRA to which the step prior to the one of the set of subsequent steps was assigned.

Clause 4. The computer-implemented method of any of clauses 1-3, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
  the database system monitoring the progress of the query and determining at the beginning of one of the set of subsequent steps that the query is now projected to fall above the on_schedule_range of the SLG and, as a result, assigning the one of the set of subsequent steps to an LPRA having a lower priority than the LPRA to which the step prior to the one of the set of subsequent steps was assigned.

Clause 5. The computer-implemented method of any of clauses 1-4, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:

the database system monitoring the progress of the query and determining at the beginning of one of the set of subsequent steps that the query is now projected to fall below a far_off_schedule_range, wherein the far_off_schedule_range encompasses the on_schedule_range of the SLG, and, as a result, assigning the one of the set of subsequent steps to an LPRA having a higher priority than the LPRA to which the step prior to the one of the set of subsequent steps was assigned and a higher priority than the LPRA to which the one of the set of subsequent steps would have been assigned had the query been projected to fall within in the on_schedule_range.

Clause 6. The computer-implemented method of any of clauses 1-5, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
  the database system monitoring the progress of the query and determining at the beginning of one of the set of subsequent steps that the query is now projected to fall above a far_off_schedule_range, wherein the far_off_schedule_range encompasses the on_schedule_range of the SLG, and, as a result, assigning the one of the set of subsequent steps to an LPRA having a lower priority than the LPRA to which the step prior to the one of the set of subsequent steps was assigned and a lower priority than the LPRA to which the one of the set of subsequent steps would have been assigned had the query been projected to fall within the on_schedule_range.

Clause 7. The computer-implemented method of any of clauses 1-6, further comprising:
  the database system monitoring the progress of the query and determining at the beginning of a close_to_completion_step of the subsequent steps that the query is now projected to fall above the on_schedule_range of the SLG and, because the close_to_completion_step is to be executed, assigning the one of the set of subsequent steps to the same LPRA as the step prior to the one of the close_to_completion_step.

Clause 8. The computer-implemented method of any of clauses 1-7 wherein the close_to_completion_step is the last of the subsequent steps.

Clause 9. The computer-implemented method of any of clauses 1-8 wherein the close_to_completion_step corresponds to a step of the subsequent steps that is projected to begin within a near_completion_time_percentage of the total query execution time.

Clause 10. A non-transitory computer-readable tangible medium, on which is recorded a computer program, the computer program comprising executable instructions, that, when executed, perform a method comprising:
  a database system receiving a query to be processed;
  the database system having resources;
  a user assigning the query to a tier of resource allocation priorities in a hierarchy of tiers, the tier having been designated as being automatically managed by the database system, the tier having a plurality of levels of priority for resource allocation (LPRAs);
  the database system decomposing the query into a first step and a set of subsequent steps, the first step having a beginning and each of the set of subsequent steps having a respective beginnings;
  the database system assigning the first step to a first LPRA, wherein executing the query at the first LPRA is projected by the database system to satisfy a service level goal (SLG) within a on_schedule_range of the SLG; and
  the database system determining during execution of the set of subsequent steps that the query is no longer projected to satisfy the SLG within the on_schedule_range of the SLG and, as a result, assigning one of the set of subsequent steps to a second LPRA different from the first LPRA, wherein executing the query at the second LPRA is projected by the database system to return execution of the query to within the on_schedule_range of the SLG.

Clause 11. The non-transitory computer-readable tangible medium of clause 10, wherein the database system assigning the first step to an LPRA includes:
  identifying an initial LPRA using a performance metric goal of the WD to which the query was assigned; and
  adjusting the first LPRA from the initial LPRA based on an estimate of the processing time of the query.

Clause 12. The non-transitory computer-readable tangible medium of any of clauses 10-11, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
  the database system monitoring the progress of the query and determining at the beginning of one of the set of subsequent steps that the query is now projected to fall below the on_schedule_range of the SLG and, as a result, assigning the one of the set of subsequent steps to an LPRA having a higher priority than the LPRA to which the step prior to the one of the set of subsequent steps was assigned.

Clause 13. The non-transitory computer-readable tangible medium of any of clauses 10-12, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
  the database system monitoring the progress of the query and determining at the beginning of one of the set of subsequent steps that the query is now projected to fall above the on_schedule_range of the SLG and, as a result, assigning the one of the set of subsequent steps to an LPRA having a lower priority than the LPRA to which the step prior to the one of the set of subsequent steps was assigned.

Clause 14. The non-transitory computer-readable tangible medium of any of clauses 10-13, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
  the database system monitoring the progress of the query and determining at the beginning of one of the set of subsequent steps that the query is now projected to fall below a far_off_schedule_range, wherein the far_off_schedule_range encompasses the on_schedule_range of the SLG, and, as a result, assigning the one of the set of subsequent steps to an LPRA having a higher priority than the LPRA to which the step prior to the one of the set of subsequent steps was assigned and a higher priority than the LPRA to which the one of the set of subsequent steps would have been assigned had the query been projected to fall within in the on_schedule_range.

Clause 15. The non-transitory computer-readable tangible medium of any of clauses 10-14, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
the database system monitoring the progress of the query and determining at the beginning of one of the set of subsequent steps that the query is now projected to fall above a far_off_schedule_range, wherein the far_off_schedule_range encompasses the on_schedule_range of the SLG, and, as a result, assigning the one of the set of subsequent steps to an LPRA having a lower priority than the LPRA to which the step prior to the one of the set of subsequent steps was assigned and a lower priority than the LPRA to which the one of the set of subsequent steps would have been assigned had the query been projected to fall within the on_schedule_range.

Clause 16. The non-transitory computer-readable tangible medium of any of clauses 10-15, further comprising:
the database system monitoring the progress of the query and determining at the beginning of a close_to_completion_step of the subsequent steps that the query is now projected to fall above the on_schedule_range of the SLG and, because the close_to_completion_step is to be executed, assigning the one of the set of subsequent steps to the same LPRA as the step prior to the one of the close_to_completion_step.

Clause 17. The non-transitory computer-readable tangible medium of any of clauses 10-16 wherein the close_to_completion_step is the last of the subsequent steps.

Clause 18. The non-transitory computer-readable tangible medium of any of clauses 10-17 wherein the close_to_completion_step corresponds to a step of the subsequent steps that is projected to begin within a near_completion_time_percentage of the total query execution time.

Clause 19. A computer-implemented method comprising:
a database system having resources and maintaining a hierarchical plurality of tiers of priorities for assigning database resources;
a user designated an automatically-managed tier from among the plurality of tiers as being automatically managed by the database system, the automatically-managed tier having a plurality of levels of priority for resource allocation (LPRAs);
a database system receiving a query to be processed and an assignment of the query to a WD assigned to the automatically-managed tier;
the database system decomposing the query into a first step and a set of subsequent steps, the first step having a beginning and each of the set of subsequent steps having a respective beginning;
the database system assigning the first step to a first LPRA, wherein executing the query at the first LPRA is projected by the database system to satisfy a service level goal (SLG) within a on_schedule_range of the SLG; and
the database system determining during execution of the set of subsequent steps that the query is no longer projected to satisfy the SLG within the on_schedule_range of the SLG and, as a result, assigning one of the set of subsequent steps to a second LPRA different from the first LPRA, wherein executing the query at the second LPRA is projected by the database system to return execution of the query to with the on_schedule_range of the SLG.

Clause 20. The computer-implemented method of clause 19 further comprising a user assigning the WD to the automatically-managed tier.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method comprising:
a database system receiving a query to be processed;
the database system having resources;
the database system assigning, based on input from a user, the query to a tier of resource allocation priorities in a hierarchy of tiers, the tier having been designated as being automatically managed by the database system, the tier having a plurality of levels of priority for resource allocation (LPRAs);
the database system decomposing the query into a first step and a set of subsequent steps, the first step having a beginning and each of the set of subsequent steps having a respective beginning;
the database system assigning the first step to a first LPRA, wherein executing the query at the first LPRA is projected by the database system to satisfy a service level goal (SLG) within a on_schedule_range of the SLG; and
the database system determining during execution of the set of subsequent steps that the query is no longer projected to satisfy the SLG within the on_schedule_range of the SLG and, as a result, assigning one of the set of subsequent steps to a second LPRA different from the first LPRA, wherein executing the query at the second LPRA is projected by the database system to return execution of the query to within the on_schedule_range of the SLG.

2. The computer-implemented method of claim 1, wherein the database system assigning the first step to an LPRA includes:
identifying an initial LPRA using a performance metric goal of the tier to which the query was assigned; and
adjusting the first LPRA from the initial LPRA based on an estimate of the processing time of the query.

3. The computer-implemented method of claim 1, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:

the database system monitoring the progress of the query and determining at the beginning of one of the set of subsequent steps that the query is now projected to fall below the on_schedule_range of the SLG and, as a result, assigning the one of the set of subsequent steps to an LPRA having a higher priority than the LPRA to which the step prior to the one of the set of subsequent steps was assigned.

4. The computer-implemented method of claim 1, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:

the database system monitoring the progress of the query and determining at the beginning of one of the set of subsequent steps that the query is now projected to fall above the on_schedule_range of the SLG and, as a result, assigning the one of the set of subsequent steps to an LPRA having a lower priority than the LPRA to which the step prior to the one of the set of subsequent steps was assigned.

5. The computer-implemented method of claim 1, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:

the database system monitoring the progress of the query and determining at the beginning of one of the set of subsequent steps that the query is now projected to fall below a far_off_schedule_range, wherein the far_off_schedule_range encompasses the on_schedule_range of the SLG, and, as a result, assigning the one of the set of subsequent steps to an LPRA having a higher priority than the LPRA to which the step prior to the one of the set of subsequent steps was assigned and a higher priority than the LPRA to which the one of the set of subsequent steps would have been assigned had the query been projected to fall within in the on_schedule_range.

6. The computer-implemented method of claim 1, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:

the database system monitoring the progress of the query and determining at the beginning of one of the set of subsequent steps that the query is now projected to fall above a far_off_schedule_range, wherein the far_off_schedule_range encompasses the on_schedule_range of the SLG, and, as a result, assigning the one of the set of subsequent steps to an LPRA having a lower priority than the LPRA to which the step prior to the one of the set of subsequent steps was assigned and a lower priority than the LPRA to which the one of the set of subsequent steps would have been assigned had the query been projected to fall within the on_schedule_range.

7. The computer-implemented method of claim 1, further comprising:

the database system monitoring the progress of the query and determining at the beginning of a close_to_completion_step of the subsequent steps that the query is now projected to fall above the on_schedule_range of the SLG and, because the close_to_completion_step is to be executed, assigning the one of the set of subsequent steps to the same LPRA as the step prior to the one of the close_to_completion_step.

8. The computer-implemented method of claim 7 wherein the close_to_completion_step is the last of the subsequent steps.

9. The computer-implemented method of claim 7 wherein the close_to_completion_step is a step of the subsequent steps that is projected to begin within a near_completion_time_percentage of the total query execution time.

10. A non-transitory computer-readable tangible medium, on which is recorded a computer program, the computer program comprising executable instructions, that, when executed, perform a method comprising:

a database system receiving a query to be processed;

the database system having resources;

the database system assigning, based on input from a user, the query to a tier of resource allocation priorities in a hierarchy of tiers, the tier having been designated as being automatically managed by the database system, the tier having a plurality of levels of priority for resource allocation (LPRAs);

the database system decomposing the query into a first step and a set of subsequent steps, the first step having a beginning and each of the set of subsequent steps having a respective beginning;

the database system assigning the first step to a first LPRA, wherein executing the query at the first LPRA is projected by the database system to satisfy a service level goal (SLG) within a on_schedule_range of the SLG; and the database system determining during execution of the set of subsequent steps that the query is no longer projected to satisfy the SLG within the on_schedule_range of the SLG and, as a result, assigning one of the set of subsequent steps to a second LPRA different from the first LPRA, wherein executing the query at the second LPRA is projected by the database system to return execution of the query to within the on_schedule_range of the SLG.

11. The non-transitory computer-readable tangible medium of claim 10, wherein the database system assigning the first step to an LPRA includes:

identifying an initial LPRA using a performance metric goal of the tier to which the query was assigned; and adjusting the first LPRA from the initial LPRA based on an estimate of the processing time of the query.

12. The non-transitory computer-readable tangible medium of claim 10, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:

the database system monitoring the progress of the query and determining at the beginning of one of the set of subsequent steps that the query is now projected to fall below the on_schedule_range of the SLG and, as a result, assigning the one of the set of subsequent steps to an LPRA having a higher priority than the LPRA to which the step prior to the one of the set of subsequent steps was assigned.

13. The non-transitory computer-readable tangible medium of claim 10, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
the database system monitoring the progress of the query and determining at the beginning of one of the set of subsequent steps that the query is now projected to fall above the on_schedule_range of the SLG and, as a result, assigning the one of the set of subsequent steps to an LPRA having a lower priority than the LPRA to which the step prior to the one of the set of subsequent steps was assigned.

14. The non-transitory computer-readable tangible medium of claim 10, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
the database system monitoring the progress of the query and determining at the beginning of one of the set of subsequent steps that the query is now projected to fall below a far_off_schedule_range, wherein the far_off_schedule_range encompasses the on_schedule_range of the SLG, and, as a result, assigning the one of the set of subsequent steps to an LPRA having a higher priority than the LPRA to which the step prior to the one of the set of subsequent steps was assigned and a higher priority than the LPRA to which the one of the set of subsequent steps would have been assigned had the query been projected to fall within in the on_schedule_range.

15. The non-transitory computer-readable tangible medium of claim 10, wherein the database system determining during execution of the set of subsequent steps that the query is no longer projected to satisfy the SLG within the on_schedule_range of the SLG and, as a result, assigning one of the set of subsequent steps to a second LPRA different from the first LPRA includes:
the database system monitoring the progress of the query and determining at the beginning of one of the set of subsequent steps that the query is now projected to fall above a far_off_schedule_range, wherein the far_off_schedule_range encompasses the on_schedule_range of the SLG, and, as a result, assigning the one of the set of subsequent steps to an LPRA having a lower priority than the LPRA to which the step prior to the one of the set of subsequent steps was assigned and a lower priority than the LPRA to which the one of the set of subsequent steps would have been assigned had the query been projected to fall within the on_schedule_range.

16. The non-transitory computer-readable tangible medium of claim 10, further comprising:
the database system monitoring the progress of the query and determining at the beginning of a close_to_completion_step of the subsequent steps that the query is now projected to fall above the on_schedule_range of the SLG and, because the close_to_completion_step is to be executed, assigning the one of the set of subsequent steps to the same LPRA as the step prior to the one of the close_to_completion_step.

17. The non-transitory computer-readable tangible medium of claim 16 wherein the close_to_completion_step is the last of the subsequent steps.

18. The non-transitory computer-readable tangible medium of claim 16 wherein the close_to_completion_step may be a step of the subsequent steps that is projected to begin within a near_completion_time_percentage of the total query execution time.

19. A computer-implemented method comprising:
a database system having resources and maintaining a hierarchical plurality of tiers of priorities for allocating database resources;
the database system designating, based on input from a user, an automatically-managed tier from among the plurality of tiers as being automatically managed by the database system, the automatically-managed tier having a plurality of levels of priority for resource allocation (LPRAs);
the database system receiving a query to be processed and an assignment of the query to a workload assigned to the automatically-managed tier;
the database system decomposing the query into a first step and a set of subsequent steps, the first step having a beginning and each of the set of subsequent steps having a respective beginning;
the database system assigning the first step to a first LPRA, wherein executing the query at the first LPRA is projected by the database system to satisfy a service level goal (SLG) within a on_schedule_range of the SLG; and
the database system determining during execution of the set of subsequent steps that the query is no longer projected to satisfy the SLG within the on_schedule_range of the SLG and, as a result, assigning one of the set of subsequent steps to a second LPRA different from the first LPRA, wherein executing the query at the second LPRA is projected by the database system to return execution of the query to with the on_schedule_range of the SLG.

20. The computer-implemented method of claim 19 further comprising the database system assigning, based on input from the user, the workload to the automatically-managed tier.

* * * * *